Oct. 2, 1928.
F. V. WALTZ
1,686,050
AUTOMOBILE AWNING
Filed Oct. 27, 1926     2 Sheets-Sheet 1
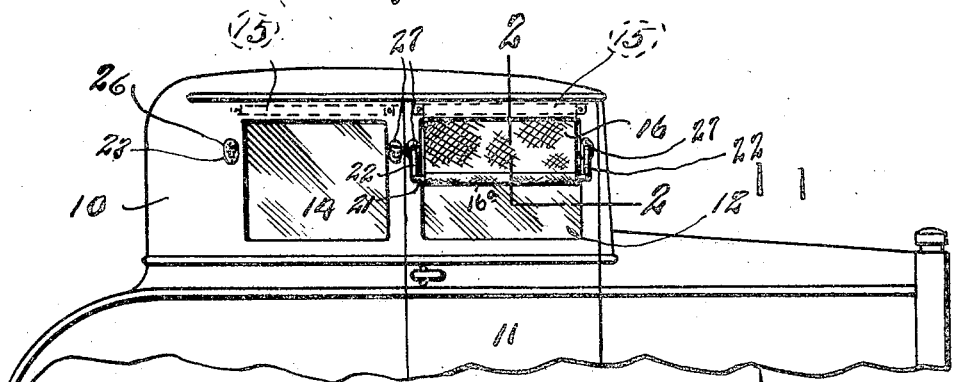
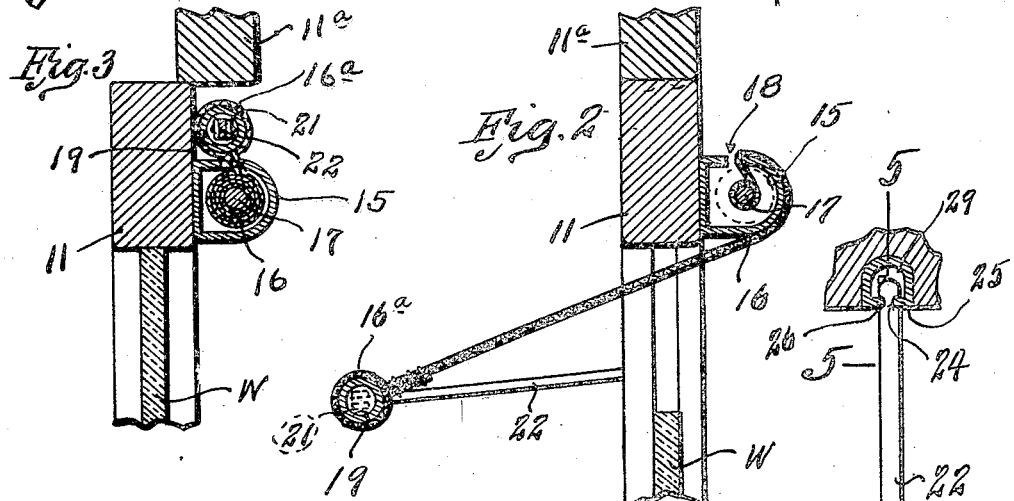
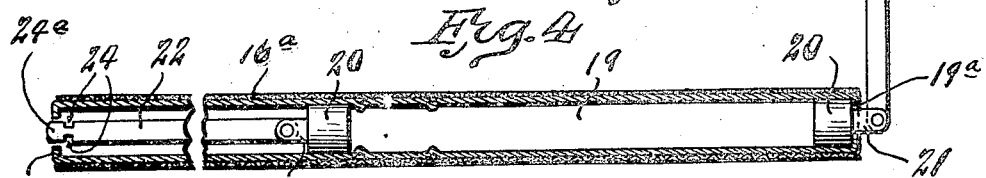
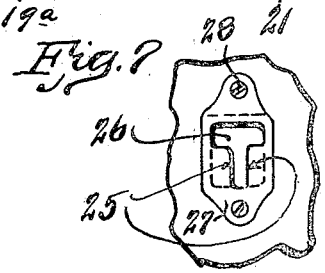
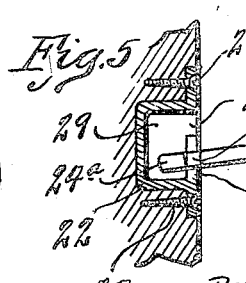
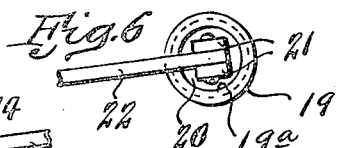
Inventor
Foster V. Waltz
By Cornwall, Cordell & Janius
Atty's.

Oct. 2, 1928.  
F. V. WALTZ  
1,686,050  
AUTOMOBILE AWNING  
Filed Oct. 27, 1926  
2 Sheets-Sheet 2
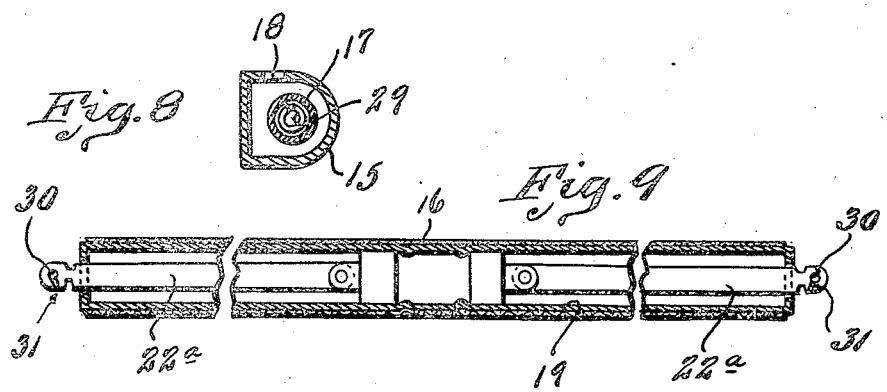
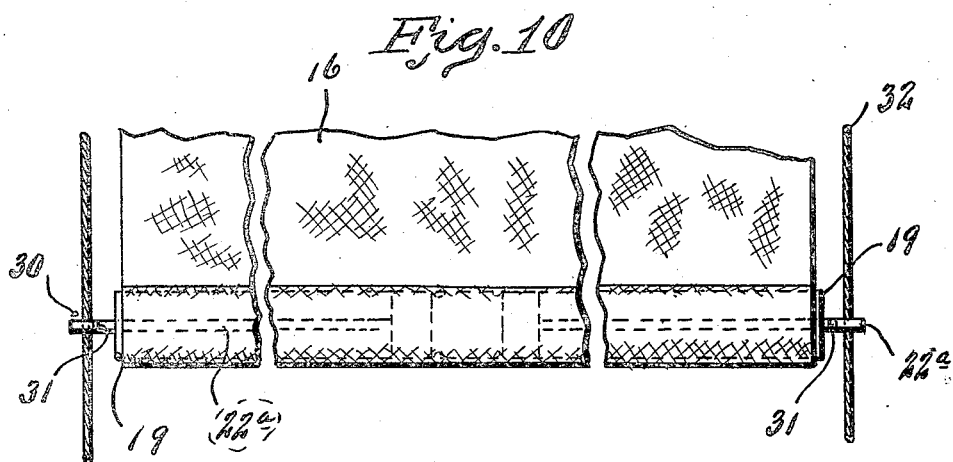
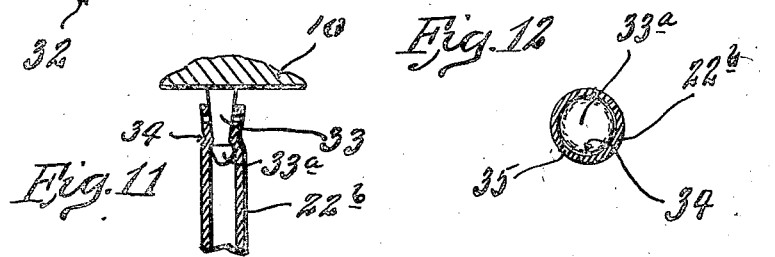
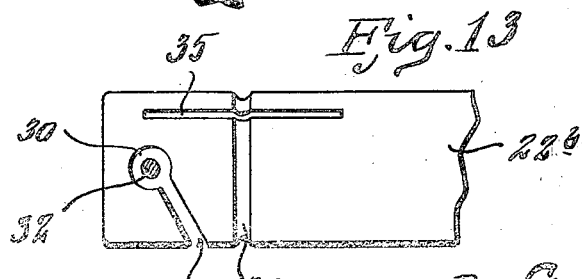
Inventor  
Foster V. Waltz  
By Cornwall, Bedell & James  
Attys.

Patented Oct. 2, 1928.

1,686,050

UNITED STATES PATENT OFFICE.

FOSTER V. WALTZ, OF ST. LOUIS, MISSOURI.

AUTOMOBILE AWNING.

Application filed October 27, 1926. Serial No. 144,502.

This invention relates to new and useful improvements in automobile awnings and the objects of the invention are to provide an awning for the door or window of an automobile which, when not in use can be concealed from view so as not to detract from the appearance of the car.

Other objects of the invention are to provide suitable mounting for supporting the awning in extended position, said mounting being adapted, when not used, to be contained in the free end of the awning so that normally it is out of the way and is always ready for use.

Further objects of the invention are to permanently fix one end of each mounting bracket to the awning and to provide means for detachably anchoring the other end of each bracket to a fixed seat so as to rigidly maintain said awning in extended position.

Additional objects of the invention are to provide an automobile awning which is simple in construction, can be easily operated and which, when not in use, is arranged on the interior of the car and not visible from the outside and does not interfere with the operation of the window or the door to which it is attached.

With these and other objects in view, my invention consists of certain novel features of construction and arrangement of parts, hereinafter more fully described and claimed, and illustrated in the accompanying drawings, in which—

Figure 1 is a fragmental elevational view of an automobile equipped with my awnings.

Figure 2 is an enlarged vertical cross section taken on line 2—2 of Figure 1.

Figure 3 is a similar view but showing the awning in retracted position.

Figure 4 is a horizontal cross section through the hollow reinforcing member of the free end of the awning showing one bracket retracted within said member and showing the other bracket in extended position and in engagement with the fixed seat.

Figure 5 is a vertical cross section taken on line 5—5 of Figure 4.

Figure 6 is an end elevational view of the hollow awning member showing one end of the bracket.

Figure 7 is a front elevational view of one of the anchoring members engageable by the free end of the bracket or bar.

Figure 8 is a vertical cross section through a modified form of my device, showing the shade roller provided with a coiled spring.

Figure 9 is a horizontal cross section through a modified form of my device showing the free ends of the brackets or bars provided with apertures for engaging guide cords when the awning is used as a window shade.

Figure 10 is an elevational view of the free end of the awning showing the ends of the bars or brackets in engagement with the window cords.

Figure 11 is a horizontal sectional view showing a modified form of anchoring means for the free ends of the brackets.

Figure 12 is an enlarged cross section taken on line 12—12 of Figure 11.

Figure 13 is an enlarged side elevational view of one end of the bracket.

The awnings now generally used for automobiles are attached to the exterior of the car and spoil the appearance of the car and are exposed to the dust and rain at all times.

The purpose of my invention is to provide an awning arranged on the interior of the car and extending outwardly through the window when in use. The shade is secured in extended position by suitable brackets which are detachably anchored to the car body or the door and which when not in use may be inserted within the tubular member of the free end of the shade so that said brackets are out of the way and always ready for use.

Referring by numerals to the accompanying drawings, 10 indicates an automobile body having a door 11 provided with a window 12, while another window 14 is arranged in said body 10. An elongated container 15 substantially cylindrical in cross-section is secured in position above each window 12 and 14 as shown in dotted lines in Figure 1. A shade 16 is wound on roller 17, the latter being journaled in each container 15 and preferably spring actuated in a well known manner so as to roll up the shade on said roller when the shade is not used. Each container is provided preferably in its upper face with a longitudinally disposed slot 18 through which said shade 16 operates. The free end 16ª of shade 16 is secured to a tubular member 19, the diameter of which is larger than the width of said slot 18 so as to prevent the free end 16ª of said shade from entering the container.

When the shade is not used it is wound on the roller with the member 19 disposed above and resting on the top of container 15 as shown in Figure 3. The relative cross section areas or diameters of container 15 and member 19 are such that when said member 19 rests on top of container 15 it is disposed below the lintel 11ª of door 11 so that said door may be opened and closed without any interference as shown in Figure 3. A pair of plugs 20 is slidably arranged in tubular member 19 and each plug is provided on one side with a longitudinally extending pair of ears 21 to which is pivotally secured one end of a mounting or bracket 22, the opposite end of which is provided with laterally disposed notches 24. These notches are formed on the opposite sides of each bar or bracket 22 and are adapted to engage the vertically disposed edges 25 of a T-shaped opening 26 which latter is formed in an anchoring member 27 and is fixed by suitable fastening devices 28 either to the walls of the car body 10 or to the vertical rails of door 11 and preferably flush with the surfaces thereof.

Each member 27 is provided with an inwardly disposed pocket 29 for receiving the end 24ª of the corresponding part when the latter is moved in position. The lengths of bars 22 are such that when plugs 20 are moved inwardly full distances bars 22 will be retracted within the tubular member 19 as indicated in Figure 4 so that the shade 16 may be readily wound on roller 17 and tubular member 19 passed through the window openings, the length of said member 19 being less than the width of the window opening through which it operates. The ends of member 19 are turned inwardly to form annular flanges 19ª which provide stops for plugs 20 and prevent the withdrawal thereof from said member 19. When it is desired to use the awning, shade 16 is pulled outwardly through the window opening and bars 22 are then withdrawn from each end of member 19 until plugs 20 engage flanges 19ª. When in this position ears 21 of the respective plugs project beyond ends 19 sufficient distance to permit bars 22 to be moved at right angles to member 19 so as to bring the notched end 24ª of each bracket in engagement with the respective T-shaped opening 26 of the corresponding anchoring member 27. When bars 22 are in extended positions they are angularly disposed relative to member 27 so that the notches 24 frictionally engage the edges 25 thereby preventing accidental disengagement of said bars. The shade is so mounted that the window pane W can be operated without in any way interfering with the shade even when the latter is in extended position as shown in Figure 2. When the shade is not in use it is completely concealed from the outside and only the small anchoring means 27 are visible. The shade 16 can be wound on roller 17 either manually by means of a knurled knob 28 fixed to one end of a roller 17 or by means of a spring 29 contained in the roller as shown in Figure 8, said spring being controlled in a well-known manner.

In Figures 9 and 10 is shown a modified form of shade wherein the ends of bars 22ª are provided near their ends with transverse apertures 30 with which communicate slots 31 disposed obliquely in said bars. The purpose of these slots is to allow guide cords 32 to be threaded through said apertures. These guide cords are vertically disposed on each side of the window and permit the use of the awnings as window shades on the inside of the car, if so desired.

In Figures 11 to 13 is shown a modified form of anchoring means for the ends of the bars 22. In this form an anchoring member 33 of a construction now generally used on automobiles is secured in position on the frame at the appropriate points, and the free end of each bar 22ᵇ is provided with a tubular portion which fits over said anchoring member and is formed with an inwardly presented reduced annulus 34 which is adapted to fit yieldingly over the shouldered head 33ª of member 33. One or more slots 35 are formed in the end of bar 22ᵇ to increase the resiliency thereof and facilitate the position of said bar on said member 33, thus detachably locking said end of bar 22ᵇ in position on said anchoring member.

My improved awning is of compact and simple construction, occupies very little space, and can be readily operated.

While I have shown and described the preferred form of my invention, it is obvious that changes in the size, form and construction can be made and substituted, without departing from the spirit of my invention as expressed in the following claims.

I claim:

1. An automobile awning comprising a support arranged above a window opening, a roller journaled in said support, a shade attached to said roller and extensible outwardly through said window opening, an open ended tubular member secured transversely to the free end of said shade, a pair of plugs slidably disposed in said tubular member, and a mounting bracket having one end pivotally secured to the outer end of a corresponding plug and having the opposite end adapted to be detachably secured to the body portion of the automobile adjacent to said window opening for holding said shade in extensible position.

2. A device of the class described comprising a hollow elongated container provided with a longitudinal slot, a shade roller arranged in said container, a shade secured to said roller and extensible outwardly through said slot, an open ended tubular member secured transversely to the free end of said shade, a pair of plugs slidably disposed in said tubular member, the outer end of each plug being provided with a longitudinal projection, bars pivotally connected at one of their ends to said projections, and anchoring means adapted to have detachably seated therein the free ends of said bars, whereby the latter are disposed laterally to said tubular member and said shade is held in extended position at an angle to the vertical plane.

3. In a device of the class described, the combination with a window frame, of an elongated hollow member secured above and inwardly of the window opening, said member being provided with a longitudinal slot, a shade wound within said member projecting through said slot and extensible outwardly through said window opening, an open ended tubular transverse member fixed to the free end of said shade, a pair of plugs slidably disposed in said tubular member, the ends of said tubular members being reduced in diameter to prevent the displacement of said plugs, a lug projecting longitudinally from the outer end of each plug and adapted to project outwardly beyond the reduced end of said tubular member, and bars having one of their ends in pivotal engagement with said lugs and movable laterally of said tubular member to bring their opposite free ends adjacent to said window opening for holding said shade in extended position, said bars being retractable within said tubular member.

4. In a device of the class described, the combination of an elongated hollow container provided with a longitudinal opening, a spring actuated roller journaled in said container, a shade wound on said roller and extensible outwardly through said opening, a tubular member fixed transversely to the free end of said shade, a pair of plugs slidably arranged within said tubular member, and a pair of rods pivotally secured at one of their ends to said plugs and movable laterally of said tubular member, the free ends of said rods being adapted to be detachably anchored to hold said shade in extended position at an angle to a vertical plane, said plugs being slidable inwardly to retract said bars within said tubular member.

5. An automobile awning comprising in combination a hollow container secured to an automobile body above and inwardly of a window opening, a roller journaled in said container, a shade wound on said roller and extensible outwardly through said window opening, a tubular member fixed transversely to the free end of said shade, a pair of plugs slidably arranged within said tubular member, and a pair of rods pivotally secured at one of their ends to said plugs and having their opposite ends adapted to be detachably seated in said body portion to hold said shade in extended position, said plugs being slidable so as to retract said bars within said tubular member, and recessed anchoring means secured exteriorly to said automobile body to receive and form detachable interlocking engagements with the free ends of said bars.

6. In an automobile awning construction, the combination with a window frame of an elongated hollow container attached to said frame above the window opening thereof, a roller mounted within said container, a shade adapted to be wound on said roller and operable into extended position through said window opening, the width of said shade being slightly less than the width of said window opening, the free end of said shade terminating in a transverse tubular portion, a pair of plugs slidably arranged in said tubular portion and provided with longitudinally projecting ears, a pair of bars pivotally secured at one of their ends to the ears of the respective plugs, and retractable therewith within said tubular portion, said plugs being movable in one direction to bring the ears thereof exteriorly of said tubular portion, whereby said bars may be moved laterally of said tubular portion, and anchoring means fixed to said window frame below said container and on the opposite side thereof for receiving the free ends of said bars, said bars and said anchoring means being provided with interengaging portions for locking said bars in position.

7. In a device of the class described, the combination of an elongated hollow container arranged inwardly of a window opening, and provided with a longitudinally disposed slot, a shade roller disposed in said container, a shade secured to said roller and projecting from said container, said shade being extensible outwardly through said window opening, an open ended tubular member secured to the free end of said shade, a pair of plugs slidably disposed within said tubular member, means for preventing the displacement of said plugs from said tubular member, said plugs being provided at their outer ends with reduced portions adapted to project beyond the ends of said tubular member, bars pivotally connected at one of their ends to said projections recessed anchoring means disposed adjacent to said window opening and adapted to detachably receive the free ends of said bars for maintaining said shade in extended position, and guide cords arranged inwardly adjacent to the opposite sides of the window opening and adapted to detachably receive the free ends of said bars for guiding the shade when the latter is used as a window shade, said plugs being slidable inwardly to retract said bars within said tubular member whereby only the free ends of said bars are disposed exteriorly of said tubular member for engagement with said guide cords.

8. A sunshade for window comprising in combination a hollow elongated member secured above and inwardly of a window opening and provided with a longitudinal slot, a shade wound within said member and extensible outwardly through said window opening to form an awning therefor, an open ended tubular transverse member fixed to the free end of said shade, a pair of plugs slidably disposed within said tubular member, projections extending from the outer ends of said plugs and adapted to be positioned exteriorly of the ends of said tubular member, bars having one of their ends in pivotal engagement with said projections and having their opposite free ends adapted to be detachably secured adjacent to said window opening to occupy positions laterally of said tubular member and hold said shade in extended position at an angle to the plane of said window, said bars being slidable when not in use into said tubular member whereby only the free ends of said bars project therefrom, and means arranged on the inside of said window opening for engaging the free ends of said bars when the latter occupy retracted positions and said shade is used as a window shade.

9. In an automobile, the combination of an elongated container having a longitudinal opening, a roller mounted within said container, a shade adapted to be wound on said roller and operable into extended position through said opening, the free end of said shade terminating in a transverse tubular portion, a pair of plugs slidably arranged in said tubular portion and provided on their outer ends with longitudinally projecting ears, a pair of bars pivotally secured at one of their ends to the ears of the respective plugs, said plugs being movable in one direction to bring the ears thereof exteriorly of said tubular portion whereby said bars may be moved laterally relative to said tubular portion, stationary anchoring means disposed below said container and on the opposite side thereof for detachably receiving the free ends of said bars, and vertically disposed guide cords arranged on the inside of the window frame for detachably receiving the ends of said bars when the latter occupy retracted positions within said transverse tubular portion and the shade is used as a window shade.

In testimony whereof I hereunto affix my signature this 23rd day of October, 1926.

FOSTER V. WALTZ.